(12) United States Patent
Vlassarev et al.

(10) Patent No.: US 9,891,973 B2
(45) Date of Patent: Feb. 13, 2018

(54) DATA STORAGE SYSTEM DURABILITY USING HARDWARE FAILURE RISK INDICATORS

(71) Applicant: SEAGATE TECHNOLOGY LLC, Cupertino, CA (US)

(72) Inventors: Dimitar Vlassarev, Broomfield, CO (US); Andrei Khurshudov, Niwot, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 214 days.

(21) Appl. No.: 14/625,382

(22) Filed: Feb. 18, 2015

(65) Prior Publication Data

US 2016/0239361 A1  Aug. 18, 2016

(51) Int. Cl.
*G06F 11/00* (2006.01)
*G06F 11/07* (2006.01)
*G06F 11/20* (2006.01)

(52) U.S. Cl.
CPC ........ *G06F 11/0727* (2013.01); *G06F 11/008* (2013.01); *G06F 11/0766* (2013.01); *G06F 11/2094* (2013.01)

(58) Field of Classification Search
CPC .............. G06F 11/0727; G06F 11/008; G06F 11/0766; G06F 11/14; G06F 11/1448; G06F 11/2056; G06F 11/2058; G06F 11/2094; G06F 3/0614; G06F 3/0616; G06F 3/0617; H04L 67/1095; H04L 67/1097
See application file for complete search history.

(56) References Cited

U.S. PATENT DOCUMENTS

| | | | |
|---|---|---|---|
| 7,000,141 B1 * | 2/2006 | Karlsson | G06F 9/5011 709/201 |
| 7,730,364 B2 | 6/2010 | Chang et al. | |
| 8,078,918 B2 * | 12/2011 | Diggs | G06F 11/008 714/42 |
| 8,185,784 B2 | 5/2012 | McCombs et al. | |
| 8,560,639 B2 | 10/2013 | Murphy et al. | |

(Continued)

OTHER PUBLICATIONS

Weil, Sage A. et al., CRUSH: Controlled, Scalable, Decentralized Placement of Replicated Data, Nov. 2006, IEEE, pp. 1-12.*

(Continued)

*Primary Examiner* — Marc Duncan
(74) *Attorney, Agent, or Firm* — Holland & Hart LLP

(57) ABSTRACT

Methods, apparatuses, systems, and devices are described for improving data durability in a data storage system. In one example method of improving data durability, a hardware failure risk indicator may be determined for each of a plurality of data storage elements in the data storage system. The method may also include storing one or more replicas of a first data object on one or more of the plurality of data storage elements, with a quantity of the one or more replicas and a distribution of the one or more replicas among the plurality of data storage elements being a function of the hardware failure risk indicators for each of the plurality of data storage elements. In some examples, the hardware failure risk indicators may be dynamically updated based on monitored conditions, which may result in dynamic adjustments to the quantity and distribution of the data object replicas.

20 Claims, 7 Drawing Sheets

(56) References Cited

U.S. PATENT DOCUMENTS

| | | | |
|---|---|---|---|
| 8,781,800 B2 | 7/2014 | Chavda et al. | |
| 9,317,349 B2* | 4/2016 | Jacoby | G06F 11/008 |
| 9,565,252 B2* | 2/2017 | Kazi | H04L 67/1097 |
| 2006/0236061 A1* | 10/2006 | Koclanes | G06F 3/0605 |
| | | | 711/170 |
| 2007/0050543 A1* | 3/2007 | Pomerantz | G06F 3/0605 |
| | | | 711/114 |
| 2009/0157991 A1* | 6/2009 | Rajan | G06F 11/008 |
| | | | 711/162 |
| 2010/0274762 A1* | 10/2010 | Murphy | G06F 11/1446 |
| | | | 707/636 |
| 2012/0284229 A1* | 11/2012 | Kim | H04L 67/1095 |
| | | | 707/634 |
| 2013/0031425 A1* | 1/2013 | Vingralek | G06F 11/008 |
| | | | 714/47.3 |
| 2014/0095813 A1* | 4/2014 | Shukla | G06F 3/0611 |
| | | | 711/154 |
| 2014/0101298 A1* | 4/2014 | Shukla | H04L 41/5006 |
| | | | 709/223 |
| 2015/0026517 A1* | 1/2015 | Ben Romdhane | G06F 11/1458 |
| | | | 714/15 |
| 2015/0186411 A1* | 7/2015 | Iliadis | H04L 67/1097 |
| | | | 707/637 |
| 2015/0317206 A1* | 11/2015 | McLean | G06F 17/30575 |
| | | | 714/6.24 |
| 2016/0011944 A1* | 1/2016 | Jain | G06F 11/1402 |
| | | | 707/674 |
| 2016/0162361 A1* | 6/2016 | Harnik | G06F 11/1461 |
| | | | 707/624 |
| 2017/0011059 A1* | 1/2017 | Stokely | G06F 17/30194 |

OTHER PUBLICATIONS

Li, Wenhao et al., A Novel Cost-effective Dynamic Data Replication Strategy for Reliability in Cloud Data Centres, 2011, IEEE, pp. 1-7.*

Myint, J. et al., "Management of Data Replication for PC Cluster Based Cloud Storage System," International Journal on Cloud Computing: Services and Architecture (IJCCSA), vol. 1, No. 3, Nov. 2011, pp. 31-41 (11 pp.).

* cited by examiner

DATA STORAGE SYSTEM DURABILITY USING HARDWARE FAILURE RISK INDICATORS

SUMMARY

The described features generally relate to one or more improved systems, methods, and/or apparatuses for improving data storage system durability. More particularly, the described features relate to techniques that may determine a quantity and distribution of replicas of a data object based on hardware failure risk indicators associated with different data storage elements in a data storage system.

Data storage may typically involve storing multiple replicas of one or more data objects on different data storage elements of a data storage system in order to reduce the likelihood of an unrecoverable data loss. When multiple replicas of a data object are stored across different data storage elements, if one of the data storage elements storing one replica of the data object fails, the other replicas of the data object can be used to rebuild a new replica on a different data storage element. In this manner, the durability of the data is relatively good because the probability of not being able to recover a given data object, due to loss of all replicas prior to successful rebuilding, is relatively low. According to techniques described herein, a number and a distribution of replicas of a data object across multiple different data storage elements is specified based on the reliability of the underlying hardware of the data storage elements. In other words, the probability or risk of each data storage element failing is considered as part of the placement decision when replicas of the data object are allocated to various data storage elements. In some embodiments, the quantity of replicas and/or the distribution of those replicas across the data storage elements is determined individually for each data object (e.g., as required by object-level durability requirements), whereas in other embodiments, the quantity and/or the distribution of the replicas is determined by considering multiple data objects and/or the data storage system as a whole. Further, the quantity and/or distribution of the replicas among the data storage elements may dynamically change in response to monitored conditions of the individual data storage elements.

Accordingly, in one implementation, a method of improving data storage system durability in a data storage system may include determining a hardware failure risk indicator for each of a plurality of data storage elements. The method also may include storing one or more replicas of a first data object on one or more of the plurality of data storage elements, with a quantity of the one or more replicas and a distribution of the one or more replicas among the plurality of data storage elements being a function of the hardware failure risk indicators for each of the plurality of data storage elements.

A data storage system is also described. According to one implementation, the data storage system may include a plurality of data storage elements, and at least one processor configured to determine a hardware failure risk indicator for each of the plurality of data storage elements and to assign a quantity of replicas of a data object and a distribution of the replicas of the data object among the plurality of data storage devices based at least in part on the respective determined hardware failure risk indicators for each of the respective plurality of data storage elements. The data storage system may include these and/or other elements configured to carry out various operations of the methods described above and herein.

A non-transitory computer-readable medium is also described. The medium may store computer-executable code for improving data storage system durability. The code may be executable by a processor to cause a device to assign respective hardware failure risk indicators to each of a plurality of data storage elements in a data storage system, and also to store a plurality of replicas of a first data object among the plurality of data storage elements, with a quantity of the plurality of replicas and also a distribution of the plurality of replicas among the plurality of data storage elements being determined based at least in part on the respective hardware failure risk indicators assigned to each of the respective plurality of data storage elements in the data storage system. The code further may be executable to carry out various operations of the methods described above and herein, including modeling and predicting hardware failures using known characteristics or monitored conditions of the data storage elements.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art. For example, the various examples and implementations described above with reference to a method, a data storage system, and a non-transitory computer-readable medium may be substituted or otherwise combined together with various aspects of the other examples described herein.

BRIEF DESCRIPTION OF THE DRAWINGS

A further understanding of the nature and advantages of the present disclosure may be realized by reference to the following drawings. In the appended figures, similar components or features may have the same reference label.

DETAILED DESCRIPTION

Figure 1:
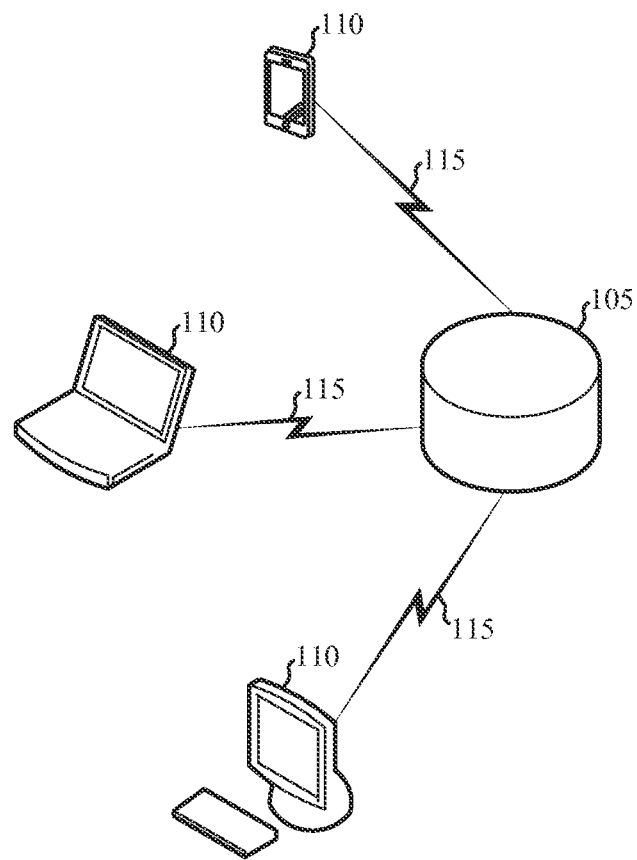
FIG. 1 is a block diagram of a computing system, in accordance with various embodiments.

The following relates generally to data storage systems including a plurality of data storage elements, and more specifically to methods for improving the durability of data objects stored across multiple data storage elements of the data storage system by adjusting the number and placement of one or more replicas of a file object to account for the reliability of the data storage elements selected to store the one or more replicas.

The increasing need to store large amounts of data is complicated by the increasing durability requirements frequently imposed on such data storage. For example, users may have terabytes and petabytes of data that need to be stored, but they may also require that the storage provider guarantee a low probability of irretrievable data loss. In order to obtain such low failure probabilities, one common technique is to store multiple replicas of each data object on several different data storage elements. In this manner, should one of the data storage elements fail, the replica on one of the other data storage elements may be used not only to retrieve the data object for use, but also to rebuild a new replica of the data object for storing on a new or different data storage element. High data durability is thus typically achieved by storing as many replicas of a data object on as many different data storage elements as possible. Such replication, of course, uses resources and it can therefore become expensive to store many different replicas on many different data storage elements. Furthermore, if the data storage elements are heterogeneous (e.g., have different reliability characteristics), hardware-agnostic replication methods may result in a significant range of durability for different data objects depending on the data storage elements used to store the replicas.

Approaches described herein may use information regarding the reliability of the data storage elements (which may be characterized by a hardware failure risk indicator) to calibrate both the quantity of replicas of a data object and the distribution of the replicas across many different data storage elements in a data storage system. Using information regarding the reliability of the underlying hardware may offer better data durability at a lower overall resource cost than hardware-reliability-agnostic replication methods that may result in suboptimal usage of the data storage element resources. Furthermore, by taking hardware reliability into account when assigning a quantity and distribution of replicas for each data object, a more uniform per-data-object loss probability distribution and/or a more uniform usage of the data storage elements may be achieved.

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with reference to certain embodiments may be combined in other embodiments.

Referring first to FIG. 1, a block diagram of a computing system 100 in accordance with various aspects of the present disclosure is shown. The computing system 100 may include a data storage system 105, which may include a number of different data storage elements.

The computing system 100 may be a distributed system in which multiple computing devices 110 may access data stored in the data storage system 105 and/or store (e.g., write) data on the data storage system 105. As such, the computing system 100 may be an enterprise system employing centralized data storage, or may be an example of unrelated computing devices 110 employing remote data storage (e.g., "the cloud").

Each of the computing devices 110 may communicate, via a respective communication link 115, with the data storage system 105 to access data (e.g., read or write). The communication links 115 may be wireless (e.g., employing various radio access technologies), as appropriate or desired.

Although wireless communication links 115 are illustrated in FIG. 1, it should be understood that wired communication links are possible as well.

Each of the computing devices 110 may be, for example, a laptop computer, a notebook computer, a netbook computer, a tablet computer, a smartphone, or the like. Thus, according to some aspects, the computing devices 110 may be portable or mobile. Additionally or alternatively, each of the computing devices 110 may be, for example, a desktop computer, a mainframe computer, or the like.

Figure 2:
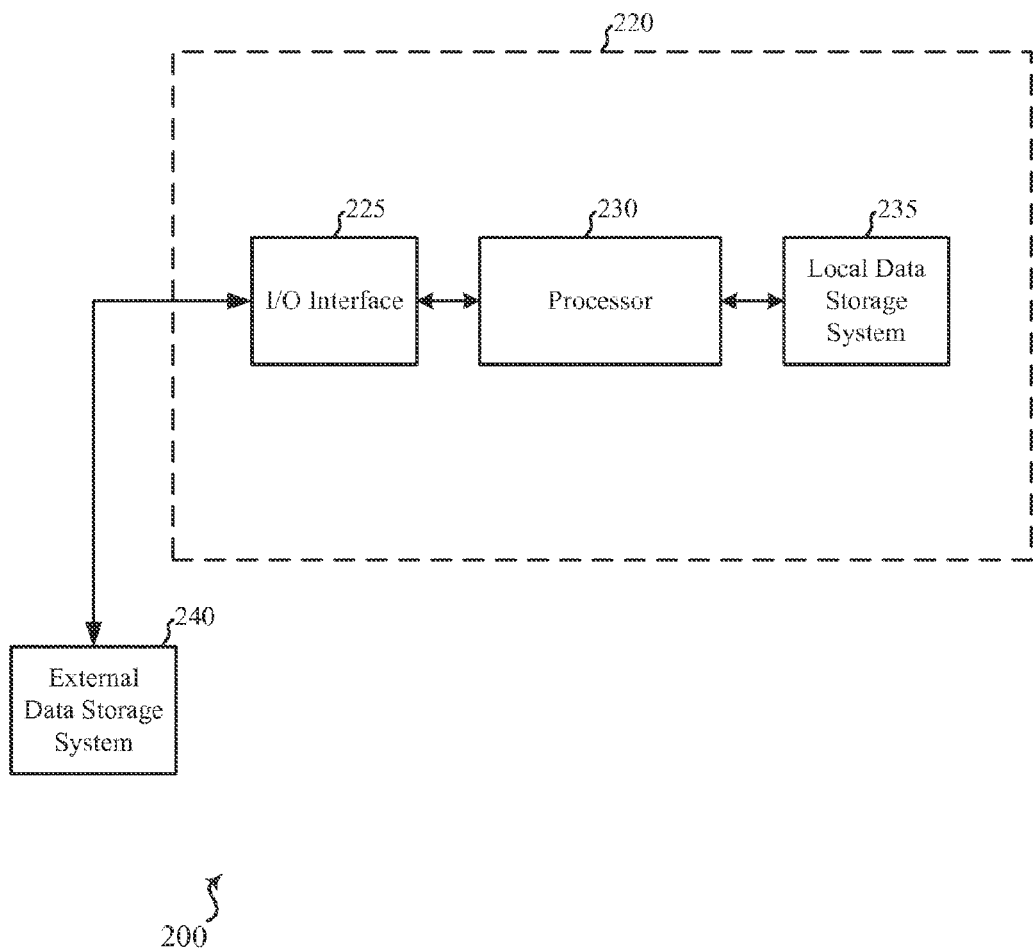
FIG. 2 is a block diagram of a computing device, in accordance with various embodiments.

Although not illustrated in FIG. 1 for the sake of simplicity, the data storage system 105 may be a plurality of data storage elements. The data storage elements may be, for example hard disk drives (HDDs), solid state drives (SSDs), flash modules, hybrid drives, optical drives, etc., or a combination thereof. In such case, the data storage system 105 may employ some level of file replication to help prevent loss of data. The file replication may in some embodiments be managed at the data storage system 105, as described in more detail below FIG. 2 shows a block diagram that illustrates an example of a computing device 220, in accordance with various aspects of the present disclosure. The computing device 220 in FIG. 2 may be an example of the computing devices 110 described above with reference to FIG. 1. The computing device 220 may include a local data storage system 235, with one or more data storage elements (such as disk drives). The computing device 220 also may include a processor 230 configured to access (e.g., read/write) data in the local data storage system 235. The computing device 220 further may include an input/output (I/O) interface 225, such as a wired or wireless modem/network adapter, that is configured to cause the computing device 220 to interface with an external data storage system 240, which may be an example of the data storage system 105 in FIG. 1. Thus the computing device 220 may be able to access data in the local data storage system 235 and/or in the external data storage system 240. Similar to the data storage system 105 in FIG. 1, either or both of the local and external data storage systems 235, 240 in FIG. 2 may include a plurality of individual data storage elements, and may employ one or more file replication techniques to help prevent the loss of data and to improve data durability, as explained in more detail below. Such file replication and improvement of the data durability may be managed by the processor 230 or by the respective local or external data storage systems 235, 240, as appropriate.

Figure 3:
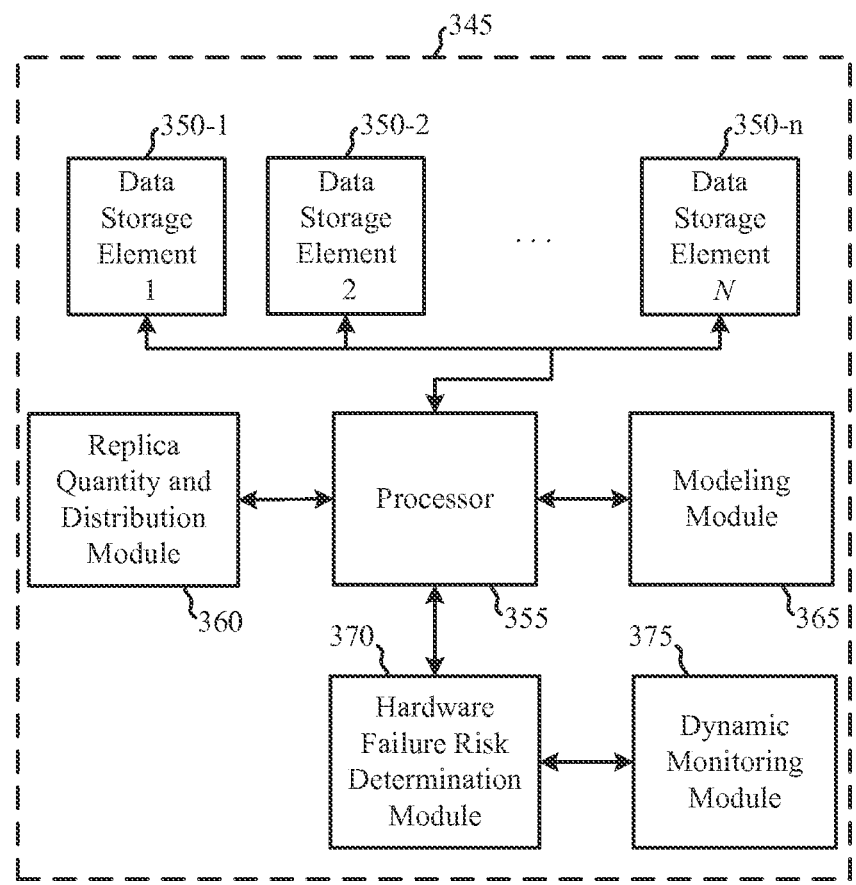
FIG. 3 is a block diagram of a data storage system, in accordance with various embodiments.

FIG. 3 shows a block diagram that illustrates an example of a data storage system 345, in accordance with various aspects of the present disclosure. The data storage system 345 in FIG. 3 may be an example of the data storage system 105 described above with reference to FIG. 1, the local data storage system 235 described above with reference to FIG. 2, or the external data storage system 240 also described above with reference to FIG. 2.

The data storage system 345 may include a plurality (N) of data storage elements 350-1, 350-2 . . . 350-n, which may be for example disk drives or other types of volatile or non-volatile data storage devices. The data storage system 345 also may include a processor 355, a replica quantity and distribution module 360, a modeling module 365, a hardware failure risk determination module 370, and a dynamic monitoring module 375.

Data stored in the data storage system 345 (e.g., on the data storage elements 350-1 . . . 350-n) may be accessed (e.g., read/written) by a respective processor of one or more computing device (not shown). The data may be accessed via communication with the processor 355 of the data storage system 345, or directly from/to each of the data storage elements 350-1 . . . 310-n. In either case, when a data object is stored in the data storage system 345, replicas of the data object may be stored on two or more of the data storage elements 350-1 . . . 350-n for redundancy. The data storage elements 350-1 . . . 350-n may be heterogeneous and may or may not be contained within a common housing element. In some embodiments, the different data storage elements 350-1 . . . 350-n may even be geographically separated in different parts of a building or even between different cities, states, or countries.

In some examples, the hardware failure risk determination module 370 may be configured to determine a hardware failure risk indicator for each of the plurality of data storage elements 350-1 . . . 310-n. The hardware failure risk indicator for reach respective one of the plurality of the data storage elements 350-1 . . . 310-n may define a reliability metric which may be based at least in part on, for example, a mean time before failure figure and/or an unrecoverable bit error rate of the respective data storage element. In some embodiments, the hardware failure risk indicator for each of the data storage elements 350-1 . . . 310-n may be dynamically updated in real-time based at least in part on one or more conditions of the data storage elements 350-1 . . . 310-n monitored by the dynamic monitoring module 375, as described in more detail below.

In some embodiments, the plurality of data storage elements 350-1 . . . 350-n may be heterogeneous, with each of the plurality of data storage elements being defined by a respective, independent hardware failure risk indicator. It will be appreciated that certain types of data storage elements may be inherently more reliable and less likely to fail that other types of data storage elements. More reliable data storage elements, however, are typically more expensive, and so it may not be practical to use only very reliable data storage elements. Accordingly, as described herein, the varying reliability of different data storage elements may be considered in determining the quantity and distribution of data object replicas among a heterogeneous group of data storage elements.

Figure 7A:
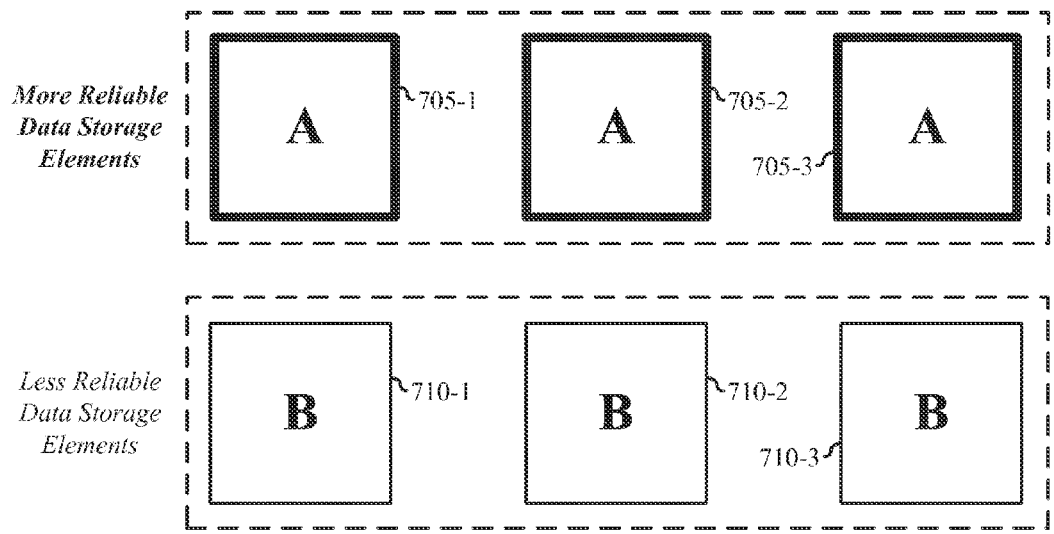
FIGS. 7A and 7B show diagrams illustrating yet another example of improving data storage system durability in a data storage system including a plurality of data storage elements, in accordance with various embodiments.
Figure 7B:
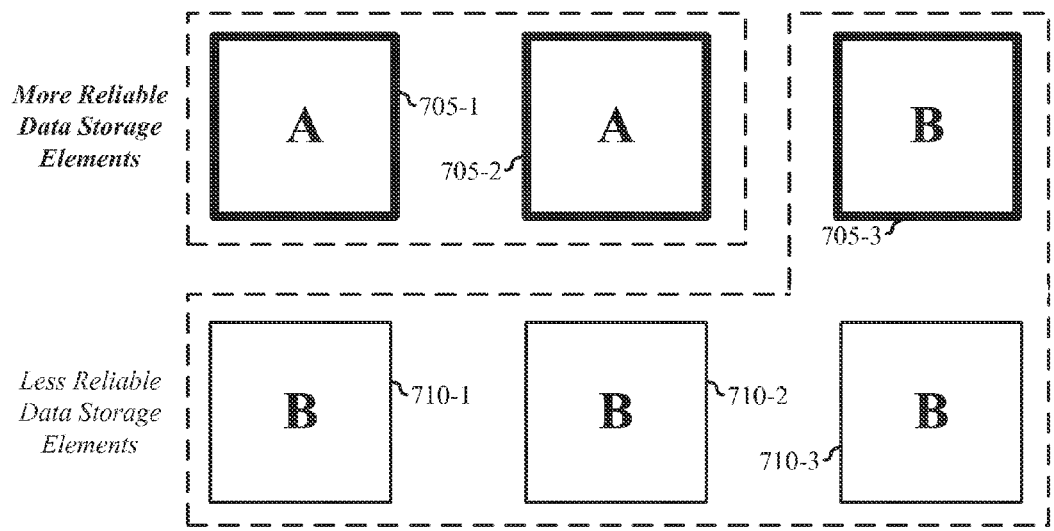

Referring still to FIG. 3, the replica quantity and distribution module 360 may be configured to determine and assign a quantity of replicas for a given data object and also a distribution of those replicas among the plurality of data storage elements 350-1 . . . 350-n in FIG. 3. The replica quantity and distribution module 360 may make this determination based at least in part on the respective hardware failure risk indicators associated with each of the plurality of data storage elements 350-1 . . . 350-n such that the quantity and distribution of the replicas is a function of the hardware failure risk indicators for each of the data storage elements 350-1 . . . 350-n, one example of which is shown in FIGS. 7A and 7B.

The processor 355 in FIG. 3 may be configured to store one or more replicas of one or more respective data objects on one or more of the data storage elements 350-1 . . . 350-n based on the quantity of replicas and the distribution of replicas determined by the replica quantity and distribution module 360.

In some but not all embodiments, the data storage system 345 may include a modeling module 365 coupled with the processor 355. The modeling module 365 may be configured to define an average number of replicas for a plurality of data objects to be stored on the plurality of data storage elements 350-1 . . . 350-n (e.g., either based on user input or based on an analysis of available storage resources and needs). The modeling module 365 may also be configured to model object level and/or system level data durability for varying quantities and varying distributions of replicas for each of the plurality of data objects among the plurality of data storage elements 350-1 . . . 350-n in order to determine a selected (e.g., optimum) quantity of replicas and a selected (e.g., optimum) distribution of replicas for each of the plurality of data objects. In these embodiments, the processor 355 may be configured to store the one or more replicas for each of the plurality of data objects based at least in part on the quantity and distribution of replicas selected by the modeling module 365.

With continuing reference to the modeling module 365, the quantity and/or distribution of the replicas of one or more data objects may be selected in a manner to improve data loss probability distribution uniformity across the plurality of data objects, and/or to improve the uniformity of resource usage across the plurality of data storage elements 350-1 . . . 350-n. Also, the selected quantities of the replicas for each data object may be maintained within a predefined range in some embodiments. As just one example of how the modeling module 365 may select quantities of replicas, the modeling module 365 may assign a greater quantity of replicas for a first data object than for a second data object if one or more of the data storage elements 350-1 . . . 350-n selected to store one or more replicas of the first data object has a lower reliability (and therefore a higher risk of hardware failure) than one or more of the data storage elements 350-1 . . . 350-n selected to store one or more replicas of the second data object.

The modeling module 365 of the data storage system 345 in FIG. 3 may also be configured to determine a rebuild time associated with a particular data object, and to provide this information to the replica quantity and distribution module 360 so that the quantity and distribution of replicas of that data object are determined also as a function of the rebuild time determined by the modeling module 365.

In some but not all embodiments, the data storage system 345 may include a dynamic monitoring module 375. The dynamic monitoring module 375 may be configured to monitor one or more conditions associated with some or all of the plurality of data storage elements 350-1 . . . 350-n and to provide this information to the hardware failure risk determination module 370 for updating the respective hardware failure risk indicators for each of the plurality of data storage elements 350-1 . . . 350-n based at least in part on the monitored conditions. The monitored conditions may include, for example, one or more of drive error rates, parity-check failures, checksum anomalies, data degradation (also known as bit rot), disk performance metrics, temperature, and so forth. Once the hardware failure risk indicators are updated, the processor 355, in conjunction with the replica quantity and distribution module 360 and the hardware failure risk determination module 370, may dynamically adjust the quantity and/or distribution of the replicas of one or more data objects stored among the plurality of data storage elements 350-1 . . . 350-n based at least in part on the dynamically updated hardware failure risk indicators for each of the plurality of data storage elements 350-1 . . . 350-n.

In some embodiments including a dynamic monitoring module 375, such adjusting of the quantity and/or distribution of the replicas of the data object may be triggered by one or more of the hardware failure risk indicators for one or more data storage element passing a predefined threshold.

For example, if the temperature of one of the data storage elements storing a replica of a data object reaches an unsafe level, that temperature may trigger an additional replica of the data object to be created on a different data storage element, whereas temperature increases below the predefined threshold may not trigger any action in some implementations. In other embodiments, however, the triggering of the adjusting of the quantity and/or distribution of the replicas may include more complicated algorithms than simple threshold passing.

Also, in some embodiments, the conditions monitored by the dynamic monitoring module 375 may be provided to the modeling module 365, the hardware failure risk determination module 370, the replica quantity and distribution module 360, and/or the processor 355 in order to generated model-based predictions of failure probability derived from the monitored conditions or other reliability metrics, optionally together with other static and/or dynamic data available. These model-based predictions may then be used to adjust the quantity and distribution of the replicas of the data objects, as described above. As just one example, if there are many identical data storage elements, and the dynamic monitoring module 375 observes higher failure rates in that group of data storage elements as compared to others, machine learning or other methods may be used to consider this information in determining the quantity and distribution of replicas implemented in the system for a given data object.

With reference still to FIG. 3, while several different modules 360, 365, 370, 375 have been described as having various functions related to improving data durability in a data storage system 345, it will be appreciated that some or all of these functions may be combined or performed by fewer modules. In one embodiment, for example, the processor 355 may be configured to determine hardware failure risk indicators for each of the data storage elements 350-1 . . . 350-n and also to assign a quantity and distribution of data object replicas based at least in part on the determined hardware failure risk indicators for each of the plurality of data storage elements 350-1 . . . 350-n. The processor may also be configured to increase the quantity, decrease the quantity, or change the distribution of the replicas of a particular data object responsive to an increased or decreased hardware failure risk indicator associated with one or more of the data storage elements 350-1 . . . 350-n, which may be determined based on one or more continuously measured reliability metrics as described above. The processor 355 may thus be configured to execute these various functions alone or in conjunction with one or more other components.

It should be understood that the various features described above with reference to FIGS. 1, 2, and/or 3 may be combined to achieve other configurations as well. Thus, the examples described above are intended to be illustrative and not exhaustive.

The components of the computing device 220 described with reference to FIG. 2 and those of the data storage systems 105, 235, 240, 345 described with reference to FIGS. 1-3 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some implementations, the processors 230, 355 may be central processing units (CPUs). The processors 230, 355 may be configured to control or otherwise cooperate with other components to carry out various operations as described herein. The processors 230, 355 may also be configured to carry out other functions of the computing device 220 or the data storage systems 105, 235, 240, 345 by controlling these and/or other components.

In some implementations, the processors 230, 355 may be disk drive controllers of the respective data storage systems 105, 235, 240, 345. The processors 230, 355 may also provide the functions of other components described herein, such as the replica quantity and distribution module 360, the modeling module 365, the hardware failure risk determination module 370, the dynamic monitoring module 375, and so forth.

Figure 4:
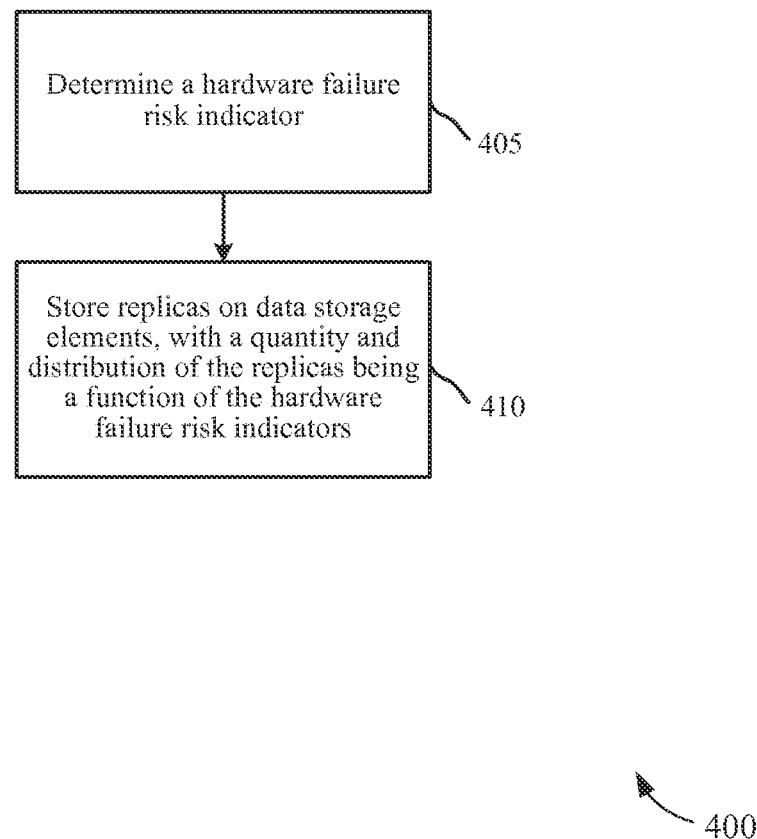
FIG. 4 is a flowchart illustrating an example of a method of improving data storage system durability, in accordance with various embodiments.

FIG. 4 is a flowchart illustrating an example of a method 400 of improving data durability in a data storage system, in accordance with various aspects of the present disclosure. For clarity, the method 400 is described below with reference to aspects of one or more of the data storage systems 105, 235, 240, 345 described above. In some implementations, a processor of such may execute one or more sets of codes to control various functional elements to perform the functions described below, alone or in conjunction with one or more other components.

At block 405 of the method 400 in FIG. 4, a hardware failure risk indicator is determined for each of a plurality of data storage elements (e.g., data storage elements 350-1 . . . 350-n in FIG. 3). At block 410 of the method 400 in FIG. 4, one or more replicas of a first data object may be stored on one or more of the data storage elements, with a quantity of the one or more replicas and/or a distribution of the one or more replicas among the plurality of data storage elements being a function of the failure risk indicators for each of the plurality of data storage elements. Replicas of second and other additional data objects may similarly be stored, with the quantity and distribution of those replicas being determined either on a per-data-object basis (e.g., based on data-object-specific durability requirements), on a system wide basis, and so forth.

Figure 5:
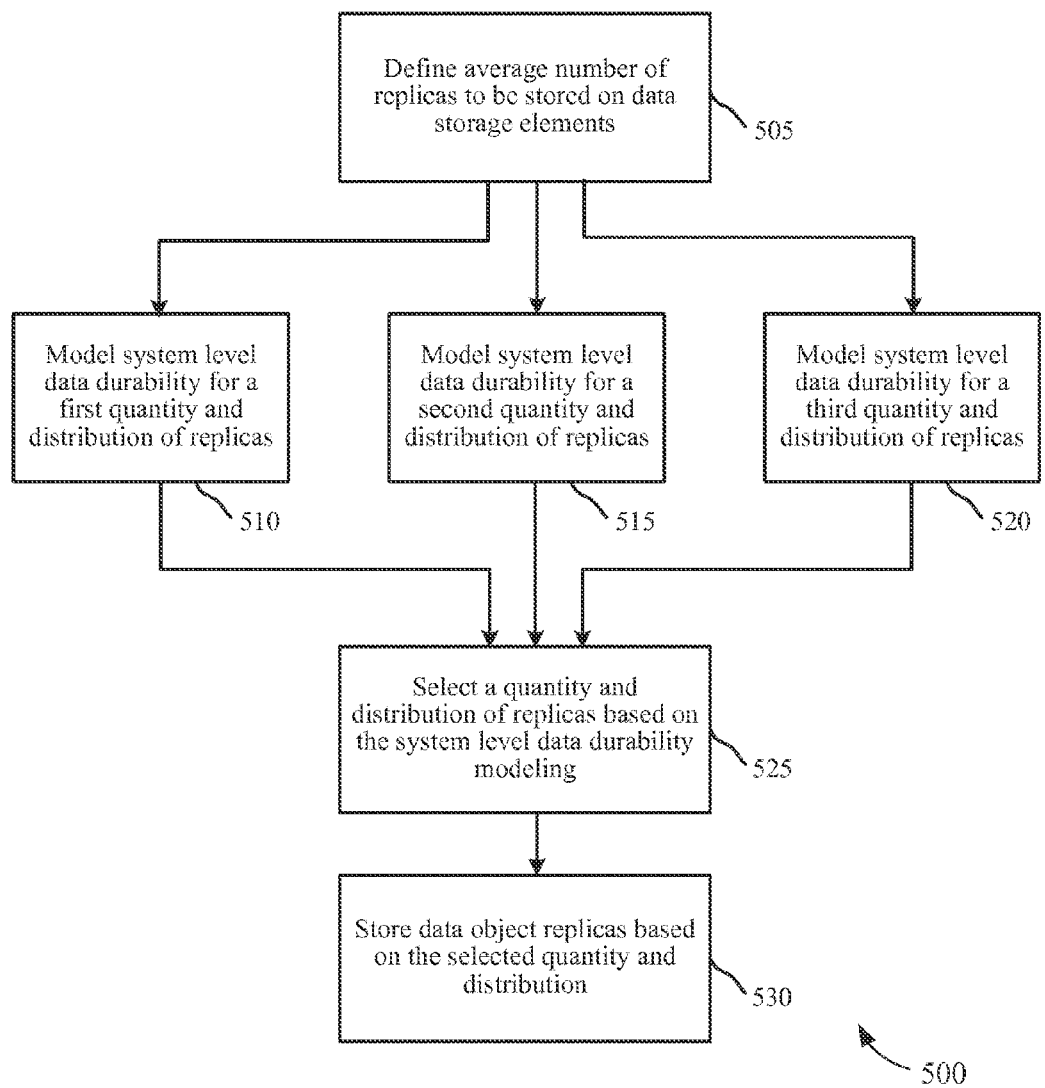
FIG. 5 is a flowchart illustrating another example of a method of improving data storage system durability, in accordance with various embodiments.

FIG. 5 is a flowchart illustrating another example of a method 500 of improving data durability in a data storage system, in accordance with various aspects of the present disclosure. For clarity, the method 500 is described below with reference to aspects of one or more of the data storage systems 105, 235, 240, 345 described above, and may be an extension of the method 400 described with reference to FIG. 4. In some implementations, a processor of such may execute one or more sets of codes to control various functional elements to perform the functions described below, alone or in conjunction with one or more other components.

At block 505 of the method 500 in FIG. 5, an average number of replicas for a plurality of data objects to be stored on a plurality of data storage elements (e.g., data storage elements 350-1 . . . 350-n in FIG. 3) may be defined, for example based on user input or based on an analysis of storage needs and available resources. At blocks 510-520 of the method 500 in FIG. 5, system level data durability may be modeled for varying quantities and varying distributions of data object replicas to determine a selected quantity and a selected distribution of replicas for each of the plurality of data objects. Such modeling may include finding an optimum quantity of replicas and/or an optimum distribution of the replicas among the plurality of data storage elements in order to improve the overall durability for some or all of the plurality of data objects, to make the data failure probability distribution more uniform across the plurality of data objects, and/or to encourage more uniformity resource usage among the multiple data storage elements. More specifically, at block 510, system level data durability for a first quantity and distribution of replicas of a plurality of data objects is modeled, and at blocks 515 and 520, system level durability for other quantities and/or distributions of replicas of the plurality of data objects are modeled.

At block 525 of the method 500 in FIG. 5, a quantity and distribution of replicas for each of the plurality of data objects is selected based at least in part on the system level data durability modeling of blocks 510, 515, and 520. At block 530 of the method 500 in FIG. 5, one or more replicas for each of the plurality of data objects may be stored based at least in part on the quantity and distribution of the replicas of the data objects selected at block 525.

Figure 6:
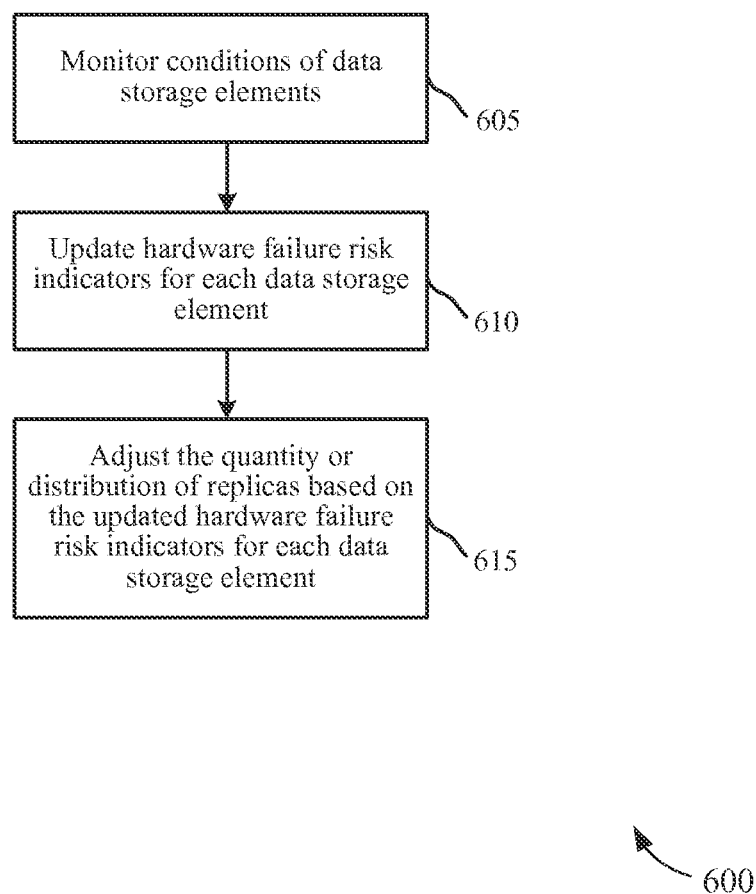
FIG. 6 is a flowchart illustrating another example of a method of improving data storage system durability, in accordance with various embodiments.

FIG. 6 is a flowchart illustrating another example of a method 600 of improving data durability in a data storage system, in accordance with various aspects of the present disclosure. For clarity, the method 600 is described below with reference to aspects of one or more of the data storage systems 105, 235, 240, 345 described above and may be an extension of the method 400 described above with reference to FIG. 4. In some implementations, a processor of such may execute one or more sets of codes to control various functional elements to perform the functions described below, alone or in conjunction with one or more other components.

At block 605 of the method 600 in FIG. 6, one or more conditions associated with one or more data storage elements (e.g., data storage elements 350-1 . . . 350-n in FIG. 3) may be monitored—for example in real-time. At block 610 of the method 600 in FIG. 6, respective hardware failure risk indicators for each of the data storage elements may be updated based at least in part on the monitored conditions of each of the data storage elements. At block 615 of the method 600 in FIG. 6, the quantity of the one or more replicas stored on the plurality of data storage elements and/or the distribution of the one or more replicas among the plurality of data storage elements may be dynamically adjusted based at least in part on the dynamically updated hardware failure risk indicators for each of the plurality of data storage elements.

It will be appreciated that while the method 600 provides a dynamic replica allocation scheme based on real-time information regarding the reliability of the hardware underlying the various data storage elements, in other embodiments, the hardware failure risk indicators may be static and set in advance based on, for example, a prior knowledge of the underlying hardware of the data storage elements and not updated based on monitored conditions.

Turning now to FIG. 7A and FIG. 7B, one example of an implementation of improving data storage system durability using hardware failure risk indicators is shown, in accordance with various aspects of the present disclosure. Referring to both FIGS. 7A and 7B, a data storage system may include a plurality of more reliable data storage elements 705-1, 705-2, 705-3 (having, for example, a 0.9% probability of data loss in a year) and a plurality of less reliable data storage elements 710-1, 710-2, 710-3 (having, for example, a 6.1% probability of data loss in a year). Note that the various data storage elements 705-1, 705-2, 705-3, 710-1, 710-2, 710-3 in FIGS. 7A and 7B are separated by their relative level of reliability, and not by their physical proximity to one another.

In FIG. 7A, three replicas for a first data object A are all stored on the more reliable data storage elements 705-1, 705-2, 705-3, with three replicas for a second data object B all being stored on the less reliable data storage elements 710-1, 710-2, 710-3. In this distribution of replicas, even though both data objects A and B have the same quantity of replicas, the overall probability of losing data object B is higher than the overall probability of losing data object A because of the higher reliability of the data storage elements 705-1, 705-2, 705-3 on which the replicas of data object A are stored. For example, for the data loss probabilities given above, the probability of losing data object A in a year may be 0.00007%, whereas the probability of losing data object B may be 0.02%.

In FIG. 7B, however, an additional replica of data object B is stored on one of the more reliable data storage elements at the expense of one of the replicas of data object A, in accordance with the techniques described above with reference to FIGS. 3, 4, and/or 5. In the configuration of FIG. 7B, while the overall probability of losing data object A is greater than in FIG. 7A, the probability of losing data object B is less than in FIG. 7A, and the least durable data object in the arrangement shown in FIG. 7B is less likely to be lost than in FIG. 7A. For example, again using the data loss probabilities given above, in the allocation of FIG. 7B, the probability of losing data object A in a year may be 0.0002%, whereas the probability of losing data object B in a year may be 0.008%—which is a 64% improvement of the data durability of the least durable data object in the system with no additional data storage resource utilization.

FIGS. 7A and 7B thus illustrate that increasing a quantity of replicas of a data object with low data reliability storage targets, even when done so at the expense of decreasing a quantity of replicas of a data object with high data reliability storage targets, can improve the durability of the least durable data object and the overall durability of the system, and can do so without increasing the overall usage of the data storage elements. In other words, data object replica allocations as described herein can improve the uniformity of the data loss probability distribution within the population of data objects, which may result in fewer service level agreement (SLA) violations in some embodiments.

The foregoing description of one example implementation of improving data storage system durability as shown in FIGS. 7A and 7B is meant to illustrate one permutation, but it is not exhaustive. Thus, other implementations of the approaches described herein are possible. For example, while FIGS. 7A and 7B each illustrate six data storage elements and replicas of two different data objects, it will be appreciated that a data storage system may have more or fewer data storage elements and may be responsible for storing more or fewer replicas of more or fewer data objects. The simplicity of FIGS. 7A and 7B may thus not be representative of an actual data storage system but is intended merely to illustrate one method for improving data durability in a data storage system. Also, FIGS. 7A and 7B have generally described a static distribution of data object replicas, but the dynamic monitoring and updating techniques described with reference for example to FIG. 6 may be implemented to dynamically adjust the allocation of the data object replicas in response to monitored conditions of the data storage elements.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over a transmission line as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), hard drive disks, solid state drives, floppy disk, blu-ray disks, and so forth, where disks usually reproduce data magnetically, while discs reproduce data optically with lasers. Combinations of the above are also included within the scope of computer-readable media.

The foregoing description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of improving data durability in a data storage system, comprising:

determining a hardware failure risk indicator for each of a plurality of data storage elements;

detecting a temperature increase in at least one data storage element of the plurality of data storage elements;

determining whether the detected temperature increase satisfies a threshold;

upon determining the threshold is satisfied, updating the hardware failure risk indicator of each data storage element associated with the temperature increase;

upon determining the threshold is not satisfied, maintaining the hardware failure risk indicator of each data storage element associated with the temperature increase;

modeling system level data durability for varying combinations of quantities and distributions of replicas for each of a plurality of data objects among the plurality of data storage elements;

identifying an optimum quantity and distribution of replicas for each of the plurality of data objects based on the modeling; and storing one or more replicas of the first data object on one or more of the plurality of data storage elements based on the identified optimum quantity and distribution of replicas for each of the plurality of data objects, the identified optimum quantity and distribution of replicas for each of the plurality of data objects being a function of the hardware failure risk indicators for each of the plurality of data storage elements.

2. The method of claim 1, further comprising:

defining an average number of replicas for the plurality of data objects to be stored on the plurality of data storage elements.

3. The method of claim 1, wherein the selected quantity of replicas for each of the plurality of data objects is maintained within a predefined range.

4. The method of claim 1, wherein the selected quantity of replicas for the first data object is greater than the selected quantity of replicas for a second of the plurality of data objects based at least in part on one or more of the data storage elements selected to store the one or more replicas of the second data object having a higher hardware failure risk indicator than one or more of the data storage elements selected to store the one or more replicas of the first data object.

5. The method of claim 1, further comprising:
selecting the quantity and distribution of the replicas for each of the plurality of data objects to improve data loss probability distribution uniformity across the plurality of data objects.

6. The method of claim 1, further comprising:
selecting the quantity and distribution of the replicas for each of the plurality of data objects to improve the uniformity of usage across the plurality of data storage devices.

7. The method of claim 1, further comprising:
dynamically updating the hardware failure risk indicators for each of the plurality of data storage elements based on monitored conditions of each of the plurality of data storage elements; and
dynamically adjusting the quantity of the one or more replicas stored on the plurality of data storage elements and the distribution of the one or more replicas among the plurality of data storage elements based on the dynamically updated hardware failure risk indicators for each of the plurality of data storage elements.

8. The method of claim 7, wherein the monitored conditions of each of the plurality of data storage elements include one or more of drive error rates, parity-check failures, checksum anomalies, data degradation, disk performance metrics, or temperature.

9. The method of claim 7, further comprising:
triggering the adjusting of the quantity of the one or more replicas stored on the plurality of data storage elements and the distribution of the one or more replicas among the plurality of data storage elements following one or more of the hardware failure risk indicators for each of the plurality of data storage elements passing a predefined threshold.

10. The method of claim 1, wherein the plurality of data storage elements is heterogeneous, with each of the plurality of data storage elements being defined by a respective, independent hardware failure risk indicator.

11. The method of claim 10, wherein the hardware failure risk indicator associated with each respective one of the plurality of data storage elements is based at least in part on at least one of a mean time before failure figure or an unrecoverable bit error rate of that respective data storage element.

12. The method of claim 10, wherein the hardware failure risk indicator for each respective one of the plurality of data storage elements is dynamically updated in real-time based on one or more monitored conditions.

13. The method of claim 1, wherein the hardware failure risk indicator for each respective one of the plurality of data storage elements defines a reliability metric of each respective one of the plurality of data storage elements.

14. The method of claim 1, further comprising:
determining a rebuild time associated with the first data object, with the quantity of the one or more replicas and the distribution of the one or more replicas among the plurality of data storage elements further being a function of the rebuild time.

15. A data storage system, comprising:
a plurality of data storage elements; and
at least one processor configured to:
determine a hardware failure risk indicator for each of the plurality of data storage elements;
detect a temperature increase in at least one data storage element of the plurality of data storage elements;
determine whether the detected temperature increase satisfies a threshold;
upon determining the threshold is satisfied, update the hardware failure risk indicator of each data storage element associated with the temperature increase;
upon determining the threshold is not satisfied, maintain the hardware failure risk indicator of each data storage element associated with the temperature increase;
model system level data durability for varying combinations of quantities and distributions of replicas for each of a plurality of data objects among the plurality of data storage elements;
identify an optimum quantity and distribution of replicas for each of the plurality of data objects based on the modeling; and
assign a quantity of replicas of a data object and a distribution of the replicas of the data object among the plurality of data storage devices based on the identified optimum quantity and distribution of replicas for each of the plurality of data objects, the identified optimum quantity and distribution of replicas for each of the plurality of data objects being based at least in part on the respective determined hardware failure risk indicators for each of the respective plurality of data storage elements.

16. The data storage system of claim 15, wherein the processor is further configured to increase the quantity of replicas of the data object stored among the plurality of data storage devices responsive to an increased hardware failure risk indicator associated with at least one of the plurality of data storage devices storing at least one replica of the data object.

17. The data storage system of claim 15, wherein the processor is further configured to change the distribution of the replicas of the data object among the plurality of data storage devices responsive to an increased hardware failure risk indicator associated with at least one of the plurality of data storage devices storing at least one replica of the data object.

18. The data storage system of claim 15, wherein the processor is further configured to adjust the quantity and distribution of the replicas of the data objects among the plurality of data storage devices based at least in part on one or more continuously measured reliability metrics of the plurality of data storage elements, or based at least in part on model-based predictions of failure probability derived from the one or more continuously measured reliability metrics.

19. A non-transitory computer-readable medium storing computer-executable code for improving data durability, the code executable by a processor to cause a device to:
assign respective hardware failure risk indicators to each of a plurality of data storage elements in a data storage system;
detect a temperature increase in at least one data storage element of the plurality of data storage elements;
determine whether the detected temperature increase satisfies a threshold;
upon determining the threshold is satisfied, update the hardware failure risk indicator of each data storage element associated with the temperature increase;
upon determining the threshold is not satisfied, maintain the hardware failure risk indicator of each data storage element associated with the temperature increase;

model system level data durability for varying combinations of quantities and distributions of replicas for each of a plurality of data objects among the plurality of data storage elements;

identify an optimum quantity and distribution of replicas for each of the plurality of data objects based on the modeling; and store a plurality of replicas of the first data object based on the identified optimum quantity and distribution of replicas for each of the plurality of data objects, the identified optimum quantity and distribution of replicas for each of the plurality of data objects being determined based at least in part on the respective hardware failure risk indicators assigned to each of the respective plurality of data storage elements in the data storage system.

20. The non-transitory computer-readable medium of claim 19, wherein the code is further executable by the processor to cause the device to:

adjust the quantity of the plurality of replicas or the distribution of the plurality of replicas based at least in part on one or monitored conditions associated with the plurality of data storage elements.

* * * * *